United States Patent
Chau et al.

(10) Patent No.: US 9,535,822 B1
(45) Date of Patent: *Jan. 3, 2017

(54) USER INTERFACE AREA COVERAGE

(71) Applicant: International Business Machines Corporation, Armonk, NY (US)

(72) Inventors: Kwan Yin Andrew Chau, Parramatta (AU); Smitha Lal, Cheltenham (AU); Stephen Pham, Cabramatta (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/041,074

(22) Filed: Feb. 11, 2016

Related U.S. Application Data

(63) Continuation of application No. 14/940,274, filed on Nov. 13, 2015.

(51) Int. Cl.
| | |
|---|---|
| *G06F 9/44* | (2006.01) |
| *G06F 9/45* | (2006.01) |
| *G06F 11/36* | (2006.01) |
| *G06F 17/30* | (2006.01) |

(52) U.S. Cl.
CPC ....... *G06F 11/3668* (2013.01); *G06F 11/3616* (2013.01); *G06F 17/30011* (2013.01); *G06F 17/3053* (2013.01); *G06F 17/30528* (2013.01)

(58) Field of Classification Search
USPC ........................................................ 717/131
See application file for complete search history.

(56) References Cited

U.S. PATENT DOCUMENTS

| | | | |
|---|---|---|---|
| 7,475,289 B2 * | 1/2009 | Rosaria ............... | G06F 11/3672 714/38.1 |
| 7,739,261 B2 * | 6/2010 | Zeng .................... | G06Q 30/02 704/9 |

(Continued)

FOREIGN PATENT DOCUMENTS

| | | |
|---|---|---|
| CN | 104216826 A | 12/2014 |

OTHER PUBLICATIONS

Urbonas, "Automated User Interface Testing", Devbridge® Group, Nov. 4, 2013, https://www.devbridge.com/articles/automated-user-interface-testing/, pp. 1-25.

(Continued)

*Primary Examiner* — Marina Lee
(74) *Attorney, Agent, or Firm* — Robert C. Bunker

(57) ABSTRACT

A method for user interface (UI) automation area coverage is presented. The method extracts document information from a unit test class, the unit test class being code used to test a user interface (UI). The method searches for a keyword within the extracted document information to find a keyword match. The method receives a weight factor from a user the weight factor giving more importance to certain keywords over the other keywords. The method weights specified keywords based on a weight factor, the weight factor increasing or decreasing an importance to the specified keywords. The method assigns a weight score to each keyword match based on the number of keyword matches and the weight factor. Furthermore the method generates a user interface report, the UI report comprising the weight score.

1 Claim, 5 Drawing Sheets

(56) References Cited

U.S. PATENT DOCUMENTS

| | | | | |
|---|---|---|---|---|
| 7,861,226 B1* | 12/2010 | Episkopos | ............ | G06F 11/3676 |
| | | | | 717/124 |
| 8,627,295 B2* | 1/2014 | Foley | ................. | G06F 11/3684 |
| | | | | 717/127 |
| 8,966,447 B2* | 2/2015 | Hoke | ................. | G06F 11/3672 |
| | | | | 717/124 |
| 9,015,666 B2* | 4/2015 | Clark | ....................... | G06F 8/73 |
| | | | | 717/123 |
| 2008/0148235 A1* | 6/2008 | Foresti | ................ | G06F 11/3612 |
| | | | | 717/123 |
| 2009/0158255 A1* | 6/2009 | Yoon | ................... | G06F 11/3672 |
| | | | | 717/124 |
| 2009/0199096 A1* | 8/2009 | Pop-Jordanov | ..... | G06F 11/3692 |
| | | | | 715/704 |
| 2009/0216746 A1* | 8/2009 | Aubin | .................... | G06Q 10/00 |
| 2011/0088018 A1* | 4/2011 | Foley | ................. | G06F 11/3684 |
| | | | | 717/131 |
| 2012/0023484 A1* | 1/2012 | Demant | .................... | G06F 8/38 |
| | | | | 717/125 |
| 2013/0018896 A1* | 1/2013 | Fleischman | ............ | G06Q 50/01 |
| | | | | 707/748 |
| 2014/0325483 A1 | 10/2014 | Pilot et al. | | |
| 2015/0301926 A1 | 10/2015 | Giannelos | | |

OTHER PUBLICATIONS

IBM: List of IBM Patents or Patent Applications Treated as Related (Appendix P), Jul. 7, 2016, pp. 1-2.
Chau et al., Pending U.S. Appl. No. 14/940,274, filed Nov. 13, 2015, titled "User Interface Area Coverage," pp. 1-25.

* cited by examiner

USER INTERFACE AREA COVERAGE

BACKGROUND

The present disclosure relates generally to computer systems for user interface testing.

User interface (UI) testing generally ensures that a computer application meets its functional requirements and achieves a high standard of quality such that it is more likely to be successfully adopted by users.

One approach to UI testing is to simply have a human tester perform a set of user operations on the target computer application and verify that it is behaving correctly. Manual testing is the process of manually testing software for defects. It requires a tester to play the role of an end user and use most of all features of the application to ensure correct behavior. To ensure completeness of testing, the tester often follows a written test plan that typically leads them through a set of important test scenarios and cases. However, this manual approach can be time-consuming, tedious, and error-prone. A more efficient approach is to write your UI tests such that user actions are performed in an automated way. The automated approach allows you to run your tests quickly and reliably in a repeatable manner. Over time when automated UI tests are written without being linked to the manual test scripts, it is difficult to keep track of what is automated and what needs to be automated.

SUMMARY

The present disclosure implements a system, method, and computer program product for managing an electronic olfactory system.

In an embodiment, a method for managing an electronic olfactory system, is provided. The method includes extracting document information from a unit test class, the unit test class being code used to test a user interface (UI). The method includes searching for a keyword within the extracted document information to find a keyword match. The method includes receiving a weight factor from a user the weight factor the weight factor increasing or decreasing an importance to the specified keywords. The method includes assigning a weight score to each keyword match based on the number of keyword matches and the weight factor. Furthermore the method includes generating a user interface report, the UI report comprising the weight score.

In another embodiment, a computer program product for managing an electronic olfactory system is provided. The computer program product includes a computer-readable storage medium having program code embodied therewith, the program code executable by a processor of a computer to perform a method which includes extracting document information from a unit test class, the unit test class being code used to test a user interface (UI). The computer program product includes searching for a keyword within the extracted document information to find a keyword match. The computer program product includes receiving a weight factor from a user the weight factor the weight factor increasing or decreasing an importance to the specified keywords. The computer program product includes assigning a weight score to each keyword match based on the number of keyword matches and the weight factor. Furthermore the computer program product includes generating a user interface report, the UI report comprising the weight score.

In an embodiment, a computer system for managing an electronic olfactory system, is provided. The computer system includes extracting document information from a unit test class, the unit test class being code used to test a user interface (UI). The computer system includes searching for a keyword within the extracted document information to find a keyword match. The computer system includes receiving a weight factor from a user the weight factor the weight factor increasing or decreasing an importance to the specified keywords. The computer system includes assigning a weight score to each keyword match based on the number of keyword matches and the weight factor. Furthermore the computer system includes generating a user interface report, the UI report comprising the weight score.

DETAILED DESCRIPTION

Figure 1A:
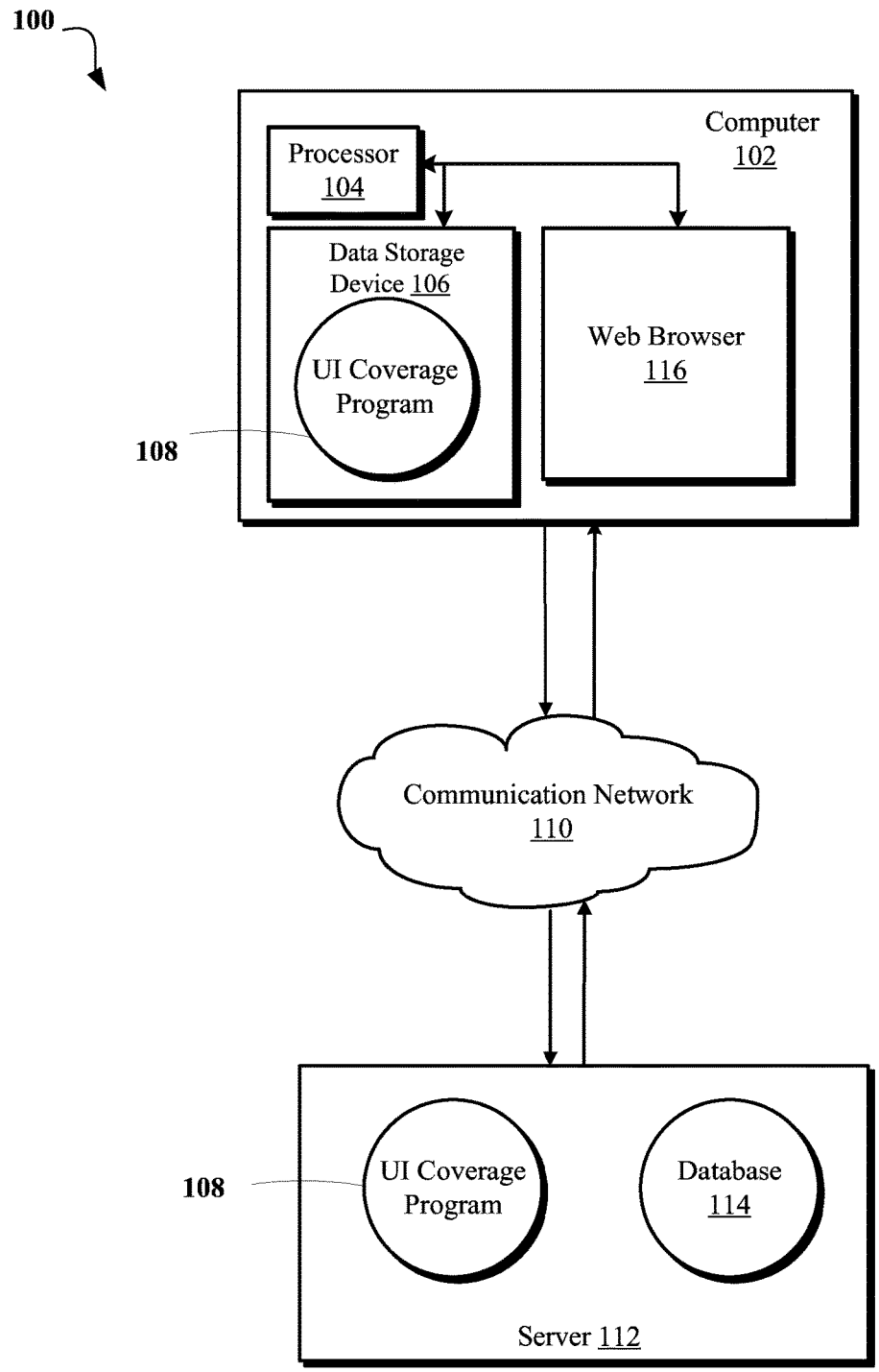
FIG. 1A is schematic block diagram depicting an exemplary computing environment for a UI coverage program, in accordance with an aspect of the present disclosure.

FIG. 1A depicts a computing environment 100 for managing the display of application forms within a web-based application. In various embodiments of the present disclosure, the computing environment 100 may include a computer 102 and server 112 connected over communication network 110.

A computer 102 may include a processor 104 and a data storage device 106 that is enabled to run a UI coverage program 108 and a web browser 116 that may display an application form or a user interface for the user to work a UI coverage program 108. Non-limiting examples of a web browser may include: Firefox®, Explorer®, or any other web browser. All brand names and/or trademarks used herein are the property of their respective owners.

The computing environment 100 may also include a server 112 with a database 114. The server 112 may be enabled to run a program such as a UI coverage program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as a UI coverage program 108 may run on the computer 102 or on the server 112. It should be appreciated that UI coverage program 108 has the same component and operation methods regardless of whether it is run on the server 112 or computer 102. Therefore UI coverage program 108 applies to both UI coverage program 108 run on a computer 102 and UI coverage program 108 run on the server 112 are interchangeably used throughout this disclosure.

Figure 1B:
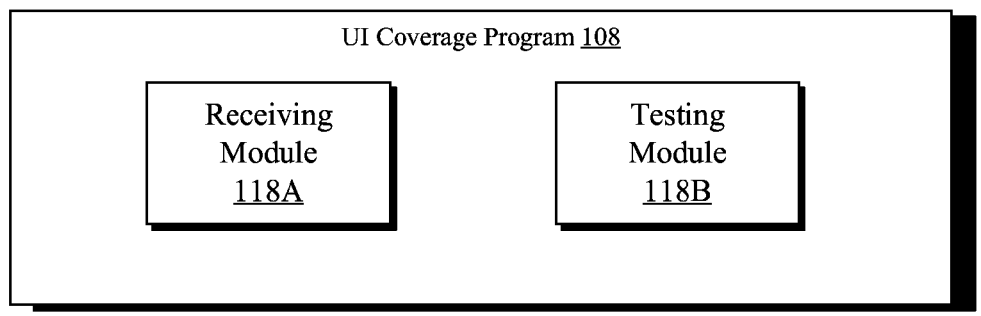
FIG. 1B is as schematic block diagram depicting components of a UI coverage program, in accordance with an aspect of the present disclosure.

Referring now to FIG. 1B, different modules of UI coverage program 108 are depicted. UI coverage program 108 comprises two modules: receiving module 118A and testing module 118B. Receiving module 118A, may receive unit test classes and/or some keywords. Testing module 118B may determine keyword matches and assign a weighted score to keywords in order to determine the UI coverage.

Figure 2:
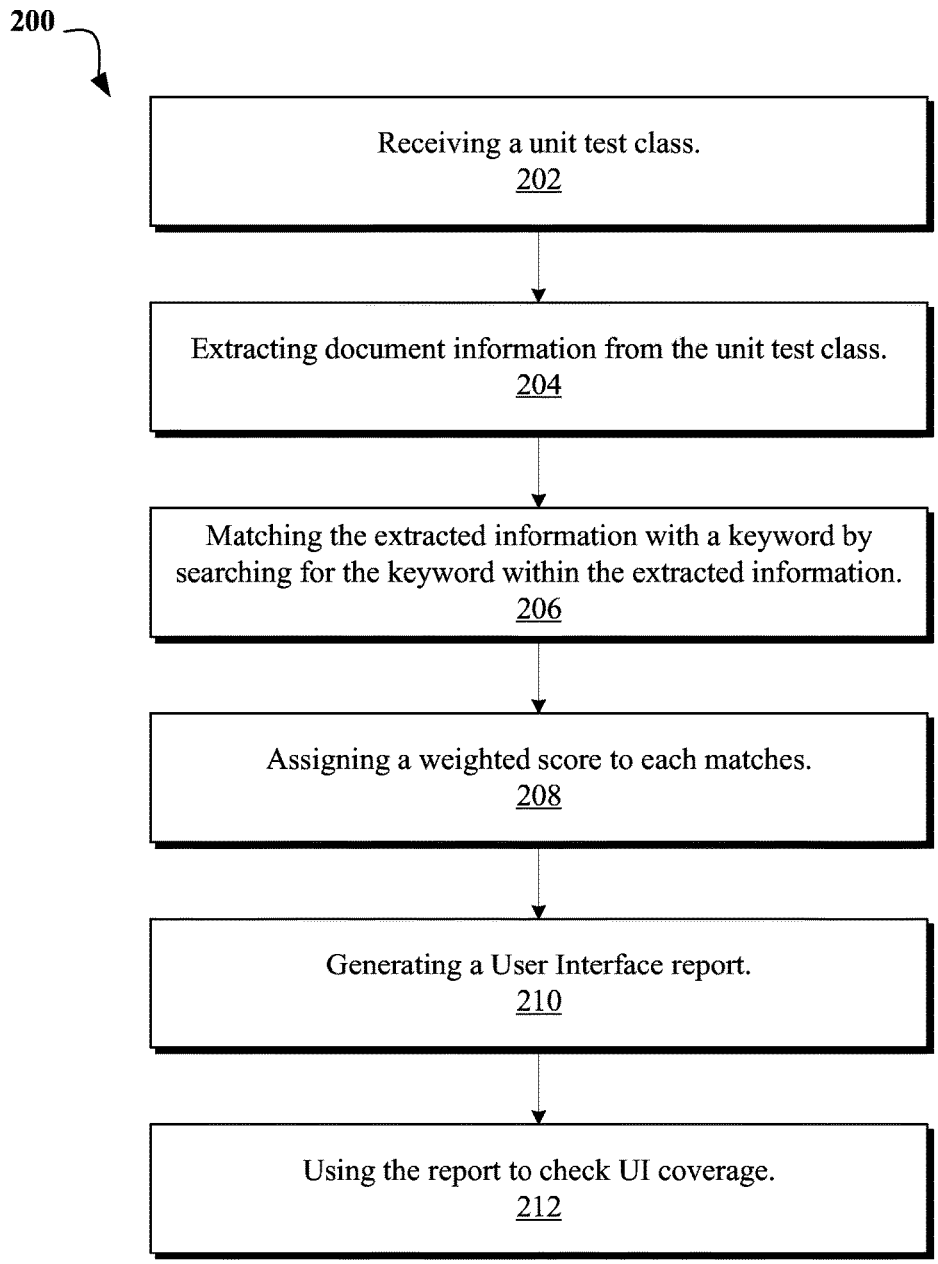
FIG. 2 is a flowchart depicting operational steps of a method for a UI coverage program, in accordance with an embodiment of the present disclosure.
Figure 3:
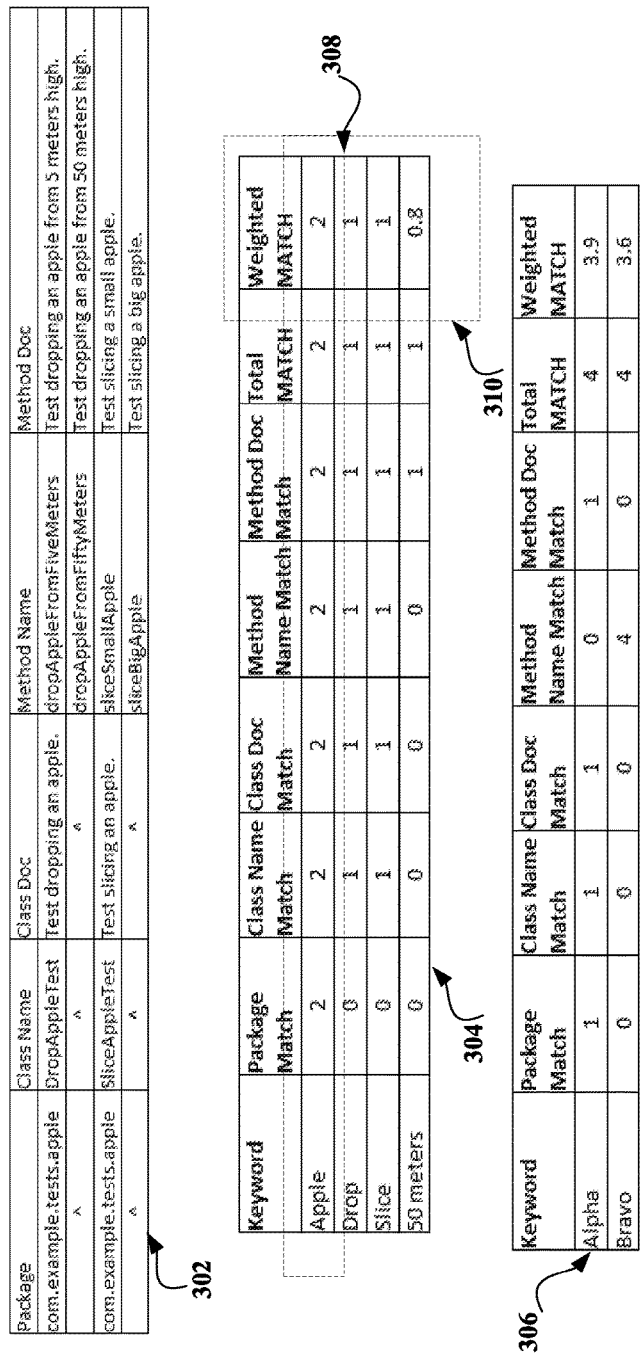
FIG. 3 is a schematic block diagram depicting operations of a UI coverage program, according to an embodiment of the present disclosure.

In reference to FIG. 2, steps of method 200, in conjunction with the depicted embodiment in FIG. 3, may be implemented using one or more modules of a computer program, for example, UI coverage program 108, and executed by a processor of a computer, such as computer 102. It should be appreciated that FIG. 2 does not imply any limitations with regard to the environments or embodiments which may be implemented. Many modifications to the depicted environment or embodiment shown in FIG. 2 may be made.

At 202, receiving module 118A may receive one or more unit test classes. In computer programming, unit testing is a software testing method by which individual units of source code, sets of one or more computer program modules together with associated control data, usage procedures, and operating procedures, are tested to determine whether they are fit for use. A unit as the smallest testable part of an application. In procedural programming, a unit could be an entire module, but it is more commonly an individual function or procedure. In object-oriented programming, a unit is often an entire interface, such as a class. Unit tests are short code fragments created by programmers or occasionally by white box testers during the development process. It forms the basis for component testing. A unit test is code that exercises a specific portion of your codebase in a particular context. Typically, each unit test sends a specific input to a method and verifies that the method returns the expected value, or takes the expected action. Receiving module 118A may receive a digital text stream comprising one or more words, and/or corresponding metadata, from an electronic input source. Receiving module 118A may also receive the code within the classes from a user or a computer implemented system. A non-limiting example of receiving a test unit class may be inputting a corpus electronically from a computer implemented source. In yet another embodiment, the tests are essentially code stored in source control (e.g. RTC). Source control allows the user to download all this code to their local file system; in that embodiment, receiving module 118A may receive the unit test class directly form the source code.

In the present embodiment, receiving module 118A, receives a unit test class from the source control code. Receiving module 118A receives the corpus electronically from the local file system in the present embodiment.

At 204, testing module 118B may extract information from the received unit test class. Testing module 118B may use variety of existing methods to extract information from the unit test classes. In an embodiment testing module 118B may extract the following from each unit test class: package name, class name, document comment for classes, method names, and document comments for methods. In another embodiment, an alternative approach to collecting this data is available. This is accomplished through the layer (e.g. page objects) which uses the HTML used when the UI tests is being executed or from previously ran UI tests.

In the present embodiment, testing module 118B uses Javadoc Tool with a standard doclet via command line or IDE (e.g. Eclipse), to export a set of HTML files containing the full documentation of the unit test classes and extract information as shown below:

com.example.tests.apple
    DropAppleTest.java DropAppleTest.html
    SliceAppleTest.java SliceAppleTest.html
    com.example.tests.orange
    DropOrangeTest.java DropOrangeTest.html
    PeelAppleTest.java PeelAppleTest.html In the present embodiment, testing module 118B also, with the exported HTML files, extracts from them only the relevant information mentioned above. This is done, in the present embodiment, by scrapping the HTML and using a custom or standard doclet. In the present embodiment Drop Appletest has the following extracted content:

<HTML>
    . . .
    <!--========START OF CLASS DATA==========-->
    . . .
    <PRE> . . . <B>com.example.tests.DropAppleTest</B></PRE>
    . . .
    <P>Test dropping an apple.<P>
    . . .
    <!--==========METHOD SUMMARY===========-->
    . . .
    <TD><CODE>dropAppleFromFiveMeters(  )</CODE>
    Test dropping an apple from 5 meters high.</TD>
    . . .
    <TD><CODE>dropAppleFromFiftyMeters(  )</CODE>
    Test dropping an apple from 50 meters high.</TD>
    . . .
    </HTML>

In an embodiment, testing module 118B may also organize the extracted information into an information chart such as information chart 302. Information chart 302 is organized by package, class name, class document, method name, and method document. For example in that embodiment, the DropAppletest (with the HTML code explained above) has a method of test dropping an apple from 5 meters high.

At 206, testing module 118B may match the extracted information with a list of keywords by searching through the extracted information for the keyword. In an embodiment, the list of pre-defined keywords are received by the receiving module 118A from a user or another computer implemented system. Keywords can be any single word or phrase specific to UI testing domain. For example, a user may just want to match the keyword "Slice", or an entire phrase based on various manual test scenarios. In that embodiment receiving module 118A may receive the list of keywords directly from a user (e.g. user typing the words directly into the program) or by another computer implemented system. A non-limiting example of receiving a keyword list may be inputting a corpus electronically from a computer implemented source. In one embodiment, testing module 118B may use a regular expression string match with the following rules: accounts for spacing, special characters, case sensitivity, numerical digits, alternative spellings, and plurality. In addition, testing module 118B may automatically notice frequently occurred keywords in other manual test scenarios and use them to generate a list of keywords. In another embodiment, testing module 118B may generate some keywords based on other and/or similar test cases.

In another embodiment, and alternative to receiving keywords is explained. There may be some unit test classes which do not utilize any Javadoc or any other method or class names. For example, in that embodiment, a class called ClassOne with method methodOne may be utilized by the unit test class. In that embodiment, an alternative approach to obtaining keywords may be used. In that embodiment, testing module 118B may allow all the UI tests to run/execute, and generate keywords based on the layers that interacts with the HTML. A layer is essentially the software used to execute the UI tests (e.g. Selenium). Non-limiting examples of a layer interaction may be an assert, click, a text input, title and alt tags, label and fieldset tags that correspond to inputs, filename of images, nearby text from P tags and Span tags, or title and keywords tag of HTML page if above is not found. It must be mentioned that the use of this method to obtain keywords is not limited to this embodiment and may be utilized in any other cases.

It must be appreciated that the use of the word "match" in an embodiment does not require an exact match between the keyword and the words used within the unit test class. For example in an embodiment spaces can be represented by characters/casing, keyword match may not be case sensitive, numbers can be in digits or words, alternate spellings would be interchangeable, or words can be singular or plural in order for the matching process to yield more accurate results. For example in that embodiment, FiftyMetersTest, fifty_meters_test, 50 meter tests would all be considered a match if the key word is 50-meters-test.

In the present embodiment, receiving module 118A receives the keyword list directly from the user (e.g. user types the keywords into the UI coverage program 108). The keywords to gauge the UI test coverage are:
 Apple
 Orange
 Drop
 Slice
 Peel
 50 meters In the present embodiment, testing module 118B determines the matches between keyword and the content of the unit test class and organizes the information within chart 304. As illustrated in chart 304, testing module 118B matches the above-mentioned keywords with each portion of the extracted information within the unit test class. Testing module 118B, also calculates the total match (i.e. total number of matches of a particular keyword).

At 208, testing module 118B may assign a weighted score to each of the keyword matches in order to measure the accuracy of these matches. In an embodiment, weight factors are assigned to each type of matched by a user. A weight factor can be used to give more importance to certain matched keywords over the other matched keywords. For example in one embodiment, if a keyword is matched within the class document or package name it is weighted differently. In another embodiment, if the keyword is matched within the method document it is weighted less than if the same keyword is matched within the class name. In yet another embodiment, the weighted score may be the same for all keyword matches. In that embodiment, the weighted score is simply based on the number of matches. These weights may be adjusted according to the particular knowledge of the naming and documentation conventions used in the test code. For example, in an embodiment, if the class document is normally very short and specific, matching the words from it is more reliable so the weight can be higher. In yet another embodiment, if the class document tends to be long and descriptive, a lower weight might be more suitable since there is more chance of it containing off-topic words. Each weight could be 100/100 if that is the most suitable. It must be mentioned that different weights for different keyword matches may be pre-defined or input directly by a user. In that embodiment, user may directly input or modify the different weights. The weighted scores indicate the level of confidence for the matches found. Therefore it must be appreciated that the total match is an unfiltered/raw number whereas the weighted match is a more analyzed/accurate number calculated by the algorithm.

In the present embodiment, user has input the following weight factors for the scoring purposes:
 Package name—10/10
 Class name—10/10
 Class doc—9/10
 Method name—9/10
 Method doc—8/10

As illustrated in "weighted match" column (column 310) of the chart 304, the weight factor is multiplied by the number of matches. For example in the present embodiment, the key word "50 meters" has been matched one time within the method document. And since the weight factor for method doc is 8/10 or 80%, testing module 118B assign a 0.8 weighted scored to 50 meters keyword (e.g. 1×0.8=0.8). It must also be appreciated that in the present embodiment, total match is not a simple addition of all the previous matches, it is the highest number of matches within any category (represented by each column within chart 304 and organized by each keyword (as illustrated by row 308 representing "apple").

In the present embodiment, chart 304 contains the information of keyword matches and the weighted score. For example as illustrated in chart 304, the keyword apple has been used in the package name. Each match is per test class. This means that even though the word "apple" is found in 5 places of the DropAppleTest class, it will only count as a single match. The SliceAppleTest class also has similar matches so "apple" has a total match of 2.

In an embodiment, different unit test classes may be compared side by side in a UI coverage report as illustrated in chart 306 (step 210). Unit tests Alpha and Bravo have been both analyzed by the testing module 118B and both given a total match and a weighted score. It must be appreciated that while the total matches are the same, in this embodiment and due to weight factors, the weighted scores may be different as illustrated by the weighted score column of chart 306.

Figure 4:
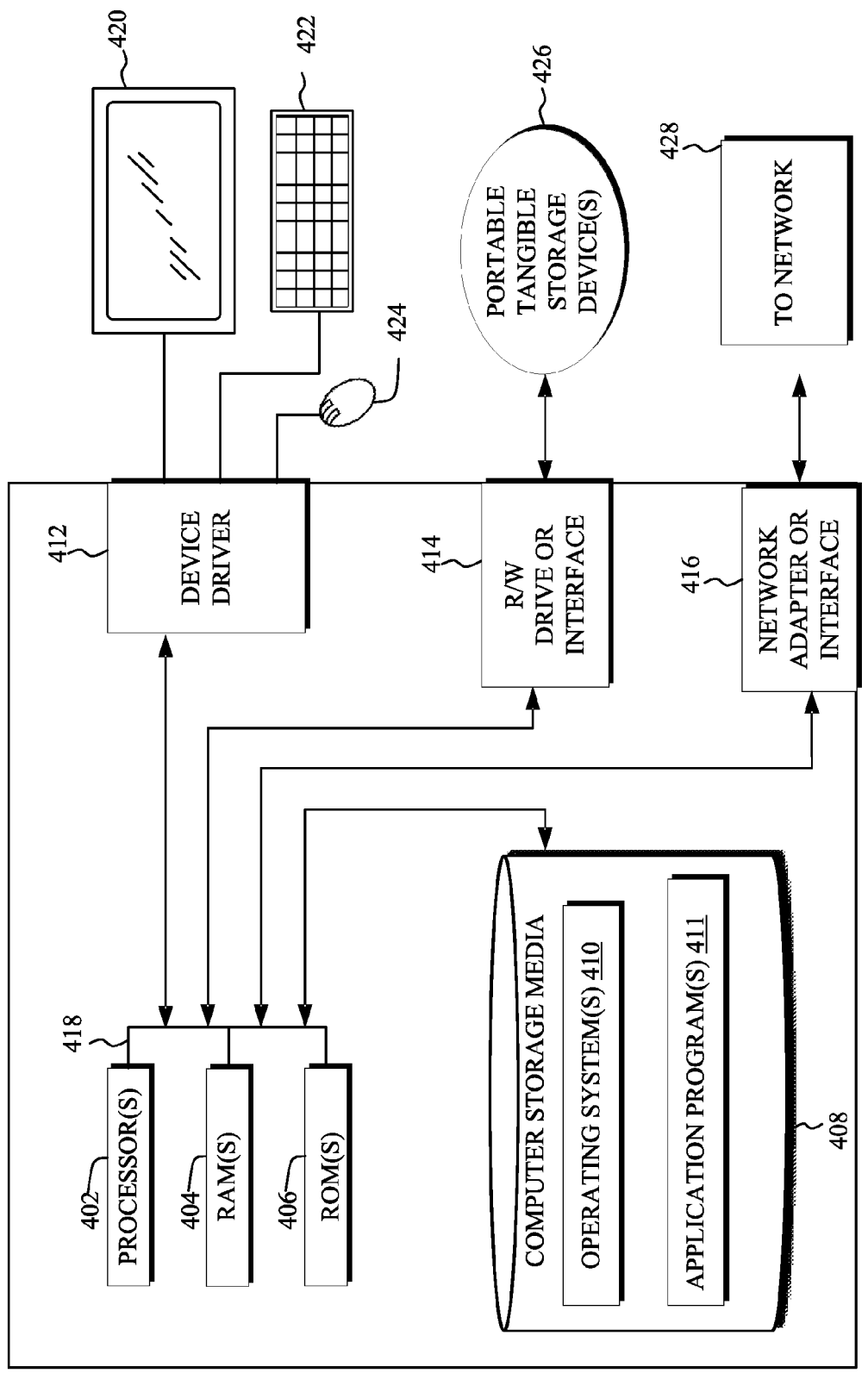
FIG. 4 is a block diagram of internal and external components of computers and servers depicted in FIG. 1, according an embodiment of the present disclosure.

Referring now to FIG. 4 of components a computer system, for example server 112 and data source 120, of computing environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network) and network adapter or interface 416. From the network (such as network 428) or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

The invention claimed is:

1. A computer-implemented method for user interface (UI) automation area coverage, comprising:
   receiving, by a server, a source code from a user, the source code comprising two unit test classes, the two unit test classes being code used to test a user interface (UI);
   extracting, by a computer, document information from each of the two unit test classes, the document information comprising package name, class name, and document code, for each of the two unit test classes;
   receiving, by the computer, a keyword from a user;
   searching, by the computer, for the keyword within the extracted document information in order to find keyword matches within each of the two unit test classes;
   determining a number of keyword matches for each of the two unit test classes, the number of keyword matches comprising a number of time the keyword has occurred within each of the two extracted document information;
   receiving, by the computer, a weight factor from a user, wherein the weight factor is defined by increasing or decreasing an importance to the keywords from a user for each of the two unit test classes;
   assigning, by the computer, a weight score to each keyword match based on the number of keyword matches and the weight factor wherein the weight score is calculated based on the number of matches of the searched keywords multiplied by the weight factor received from the user for each of the two unit test classes;
   determining, by the computer, a total match and a total weight score for the unit test for each of the two unit test classes;
   ranking, by the computer, each of the two unit test classes based on the respective weight scores; and
   generating, by the computer, a UI coverage report, the UI coverage report comprising the weight score and their respective ranks for each of the two unit test classes.

* * * * *